United States Patent
Takahashi et al.

Patent Number: 5,221,384
Date of Patent: Jun. 22, 1993

[54] PNEUMATIC RADIAL TIRE WITH A BELT COVERING LAYER REINFORCED WITH CORE-SHEATH COMPOSITE FIBER CORDS

[75] Inventors: Shuji Takahashi, Hiratsuka; Tsuneo Morikawa, Hadano, both of Japan

[73] Assignee: The Yokohama Rubber Co., Ltd., Tokyo, Japan

[21] Appl. No.: 653,999

[22] Filed: Feb. 13, 1991

Related U.S. Application Data

[63] Continuation of Ser. No. 344,348, Apr. 28, 1989, abandoned.

Foreign Application Priority Data

May 10, 1988 [JP] Japan .................. 63-111510

[51] Int. Cl.$^5$ ................. B60C 9/18; B60C 9/20
[52] U.S. Cl. ................. 152/451; 152/527; 152/531; 152/533
[58] Field of Search ............ 152/451, 458, 526, 527, 152/536, 537, 556, 557, 548, 564, 531, 533; 57/510, 902; 428/373, 397, 398

[56] References Cited

U.S. PATENT DOCUMENTS

| | | | |
|---|---|---|---|
| 3,378,055 | 4/1968 | Robertson | 152/556 |
| 3,850,219 | 11/1974 | Snyder | 152/531 |
| 4,184,530 | 1/1980 | Mirtain | 152/527 |
| 4,350,006 | 9/1982 | Okamoto et al. | 264/172 |
| 4,564,055 | 1/1986 | Ghilardi | 152/526 |
| 4,602,666 | 7/1986 | Kabe et al. | 152/527 |
| 4,849,149 | 1/1989 | Miyoshi et al. | 264/210.5 |
| 4,987,030 | 1/1991 | Saito et al. | 57/902 X |

FOREIGN PATENT DOCUMENTS

| | | | |
|---|---|---|---|
| 56-140128 | 11/1981 | Japan . | |
| 6512920 | 11/1965 | Netherlands . | |
| 1165853 | 10/1969 | United Kingdom | 152/451 |

Primary Examiner—Michael W. Ball
Assistant Examiner—Adrienne C. Johnstone
Attorney, Agent, or Firm—Nikaido Marmelstein Murray & Oram

[57] ABSTRACT

A pneumatic radial tire including a belt covering reinforcing layer comprising fiber cords each of which comprises a plurality of filaments of a core-sheath composite fiber which comprises a core component of a polyester polymer and a sheath component of a polyamide polymer.

1 Claim, 2 Drawing Sheets

PNEUMATIC RADIAL TIRE WITH A BELT COVERING LAYER REINFORCED WITH CORE-SHEATH COMPOSITE FIBER CORDS

This application is a continuation of application Ser. No. 344,348 filed Apr. 28, 1989 now abandoned.

BACKGROUND OF THE INVENTION

The present invention relates to a pneumatic radial tire. More particularly, the invention relates to such a pneumatic radial tire in which end portions of a belt layer disposed on a carcass layer in a crown portion of the tire are covered with a belt covering reinforcing layer including fiber cords and which has improved high speed durability and tire uniformity.

Known pneumatic radial tires include such ones in which in a crown portion of the tire, at least two high stiffness belt layers having a cord angle of 10° to 30° relative to the circumferential direction of the tire are disposed on a carcass layer having cords arranged in a radial direction of the tire. It is also known that in order to enhance the high-speed durability of radial tires of the above structure, a belt covering reinforcing layer having cords arranged substantially in the tire circumferential direction is laminated at least at each end portion of the belt layers. When the tires are run at a high speed, the belt covering reinforcing layer functions to prevent the belt layers from undergoing such a phenomenon in which end portions thereof tend to come up due to the effect of centrifugal force. Thus, the belt covering reinforcing layer is incorporated as above so as to suppress the shearing strain in end portions of belt layers, prevent the belt layer end portions for undergoing a separation rupture and enhance the high speed durability of tires.

For the fiber cord for use in or for the belt covering reinforcing layer, conventionally polyamide fibers are normally utilized in that they have a good bonding property toward or relative to rubber and also a sufficient heat resistance for standing the heat generated as a result of a shearing deformation in belt layer end portions. Then, in order to enhance the initial modulus of polyamide fiber cords, it is normally operated to subject the cords to a heat treatment in a condition of the cords being applied with an excessive tension. However, when so treated, the polyamide fiber cords undergo a considerable increase in their heat shrinkage, so that at the time of vulcanization of tires, they tend to undergo a considerable extent of contraction, whereby a problem is likely such that there becomes a dislocation phenomenon generated in a splice portion in the belt covering reinforcing layer. If this phenomenon occurs, then the belt layers become waved and/or their width becomes irregular in the vicinity of the splice portion of the belt covering reinforcing layer, whereby the tire uniformity tends to be considerably lowered.

Another example of useful fibers for the belt covering reinforcing layer is the class of polyester fibers which essentially have a higher initial modulus than the above considered polyamide fibers. With polyester fibers, however, their molecular structure is such that the functional groups which they contain are relatively limited, so that they have the shorcoming that their adhesive or bond affinity to rubber is relatively limited. Therefore, in making use of polyester fibers, conventionally it has been indispensable to operate a two-step treatment for enhancing the bonding property of the fibers, which comprises preparatively treating the fibers with an epoxy based adhesive or an isocyanate based adhesive and then treating with a mixture solution comprising a resorcinol-formalin primary condensate and a rubber latex (the so-called RFL). To have to operate such a two-step treatment for enhancement of the bonding property is disadvantageous in that it lowers the efficiency of the production of the belt covering reinforcing layer and eventually raise the tire production cost. Another difficulty with polyester fibers resides in that their chemical stability is relatively low, so that the ester bonds in the polymer chain are prone to be hydrolyzed with moisture and amine compounds to be generated from a vulcanization accelerator contained in rubber, and as a result of this, it tends to be difficult to obtain a high cord strength. Actually, belt covering reinforcing layers made with use of polyester fibers were found not to come up to comparable layers made with use of polyamide fibers, with respect to the high speed durability.

SUMMARY OF THE INVENTION

Accordingly, it is a primary object of the present invention to provide a pneumatic radial tire which is improved in or relating to the belt covering reinforcing layer and of which not only the tire uniformity but also the high speed durability are thereby improved. It also is an object of the invention to provide a pneumatic radial tire which is removed of both of the above indicated problems, one to do with the heat shrinkage in the cases of use of a polyamide fiber for the belt covering reinforcing layer, the other to do with the bond property toward rubber in the bases of use of polyester fibers.

To attain the above objects, the present invention provides a pneumatic radial tire which is characterized in that it includes a belt covering reinforcing layer the cords in which comprise core-sheath type composite fiber filaments having a polyester type polymer as the core component and a polyamide type polymer as the sheath component.

DETAILED DESCRIPTION OF THE PREFERRED EMBODIMENTS

Figure 1:
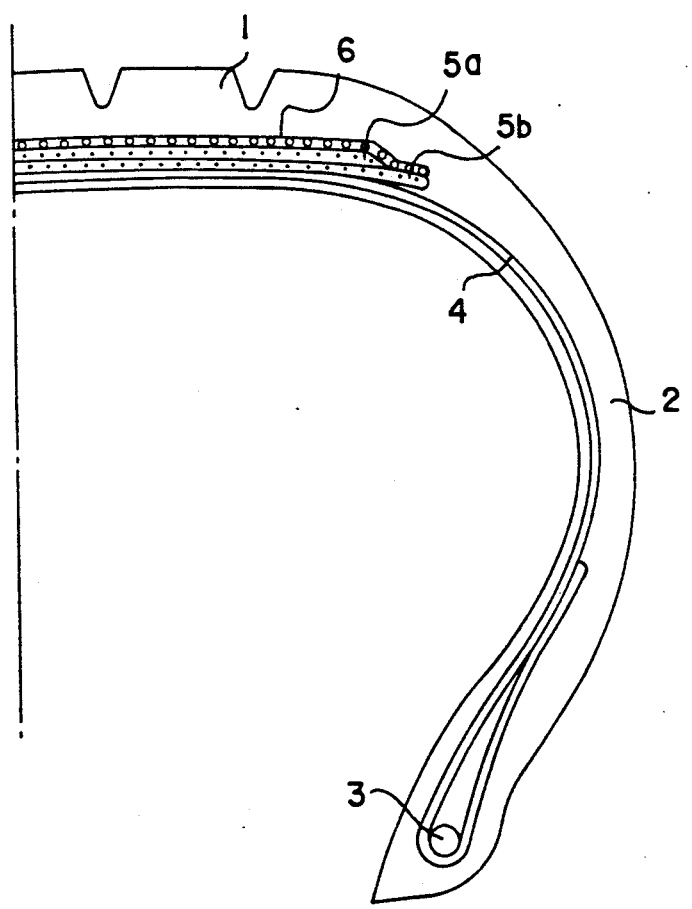
FIG. 1 is a sectional view, showing a half portion of a radial tire embodying the present invention.

In FIG. 1 illustrating a radial tire according to the present invention, the reference numeral 1 denotes the tread of the tire and the numeral 2 shows side wall portions connected to and extending from side ends of the tread. In an inner end portion of each of the left and the right side wall portions 2, a bead wire 3 is embedded, and a carcass layer 4 is disposed in a manner of bridging the left and the right bead wires 3. Between the tread 1 and the carcass layer 4, two belt layers 5a and 5b are disposed, which are covered with a belt covering reinforcing layer 6. Belt layers 5a and 5b comprise steel cords arranged in a cord angle of 10° to 30° relative to the circumferential direction of the tire, and are arranged so that cords in a first belt layer 5a cross those in a second belt layer 5b. The belt covering reinforcing layer 6 is composed of fiber cords as will be later described in greater detail, which are arranged substantially in the tire circumferential direction.

Figure 2:
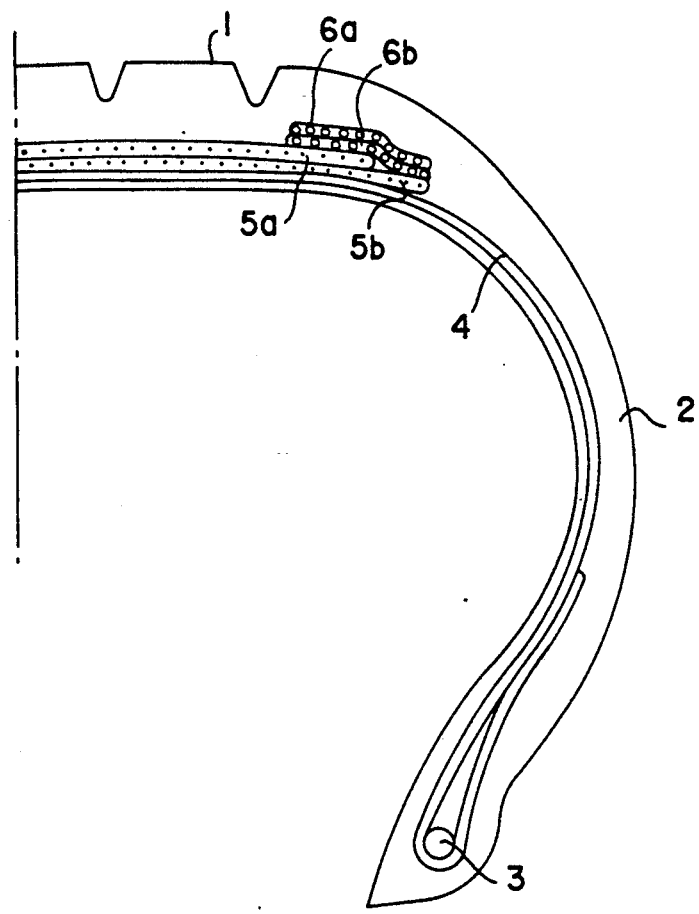
FIG. 2 shows a same sectional partial view as FIG. 1 but represents another embodiment of the invention.

According to and for purposes of the present invention, it is sufficient if the belt covering reinforcing layer 6 is so provided as to cover at least an end portion at respective sides of the belt layer 5a and 5b, so that alternative to the arrangement shown in FIG. 1, it may well be designed to cover each side end portion alone of the belt layer 5a and 5b with the reinforcing layer 6 as shown in FIG. 2.

According to the invention, the cord in or for the belt covering reinforcing layer 6 is composed of a plurality of core-sheath composite fiber filaments hereinafter sometimes referred to as core-sheath type composite filaments. Each of the core-sheath composite fiber filaments comprises a core component of a polyester or polyester type polymer and a sheath component of a polyester or polyamide type polymer and which are altogether interlaced or drawn and twisted.

Figure 3:
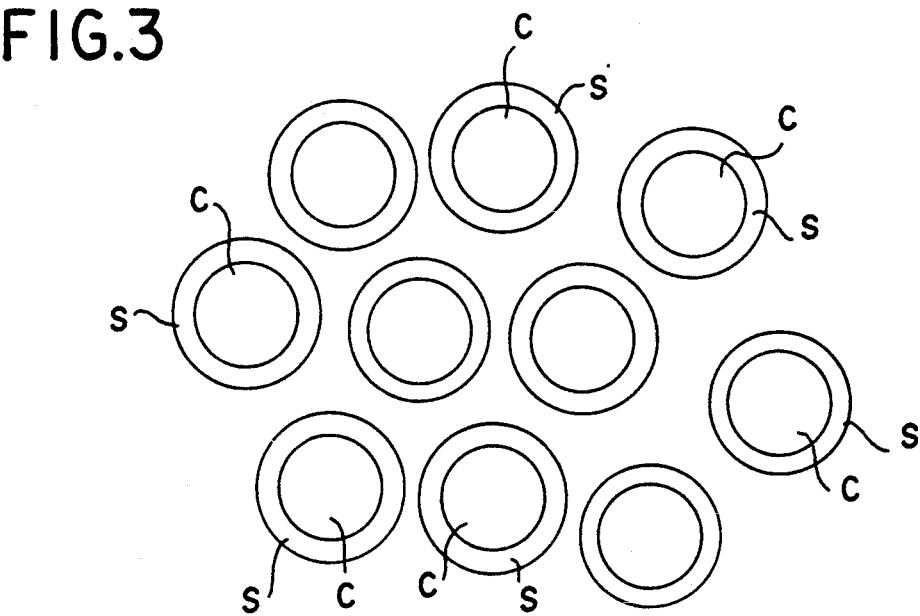
FIG. 3 is a sectional view, showing an example of core-sheath type composite fiber filaments for use for the belt covering reinforcing layer according to the invention.

FIG. 3 is a sectional view, showing an example of the core-sheath type composite fiber filaments useful for the cord for the belt covering reinforcing layer. As shown, the core-sheath type composite fiber comprises a core component C which occupies a central or core portion in section of the monofilament structure and a sheath component S surrounding the core component C, and this sectional structure continues in the axial direction of the fiber. The composite fiber may comprise a single core component C in the sheath component S as illustrated in FIG. 3 or it may otherwise comprise two or more core components C in the sheath component S.

According to the present invention, the core component in or of the core-sheath type composite fiber comprises a polyester type polymer, while the sheath component comprises polyamide type polymer. If this relative arrangement of the core and the sheath comprising different polymers is reversed, it no longer is possible to attain the intended objects according to the invention. By arranging a polyamide type polymer as sheath component covering the core component comprising a polyester type polymer, it is possible to provide such a fiber structure of which the fiber surface to be contacted with a rubber layer is formed by the polyamide type polymer having a good bond property toward rubber and in which the polyester type polymer of which the bond property toward rubber is relatively low is maintained apart from rubber. Also, since the polyester type polymer forming the core component has a higher initial modulus than the polyamide type polymer forming the sheath component, the core-sheath type composite fiber can possess such a high modulus as comparable to the modulus of polyester fibers. Moreover, the core component polyester type polymer is covered with the polyamide type polymer, the core-sheath type composite fiber not only hardly undergoes a deterioration of its bonding property toward rubber but also can exhibit a remarkable chemical stability in that the ester bonds are not hydrolyzed with moisture and amine compounds generated from a vulcanization accelerator contained in rubber, so that the fiber does not deteriorate.

The polyester type polymer for the core component of the core-sheath type composite fiber is typically represented by polyethylene terephthalate having ethylene terephthalate as major repeating structural unit of the polymer chain, and preferably useful is polyethylene terephthalate having an intrinsic viscosity of at least 0.80 when measured at 25° C. using orthochlorophenol as the solvent, which may be copolymerized with a small amount of a copolymerizable third component, for example carboxylic acid such as isophthalic acid and p-oxybenzoic acid, and derivatives thereof. Also, the polyamide type polymers for the sheath component are represented by nylon 66 (polyhexamethylene adipamide), nylon 6 (polycaprolactam), nylon 46 (polytetramethylene adipamide) and copolymers thereof, having a fiber forming property. Where polyethylene terephthalate is used for the polyester type polymer for the core component, for the polyamide for the sheath component use is preferably made of nylon 66 having a melting point close to the melting point of the polyethylene terephthalate and a good yarn forming property and preferably having a relative viscosity in sulfuric acid at 25° C. of at least 2.8.

Although no particular limitation is applicable to the composite ratio of components of the core-sheath type composite fiber (namely, the ratio of cross-sectional areas of the core component and the sheath component), preferably the ratio of the core component polyester type polymer is set as large as possible. This is because, with respect to the chemical stability and the bonding property toward rubber of the core component polyester type polymer which are improved by the sheath component comprising a polyamide type polymer, it is possible to effect a further improvement and also to further suppress the lowering of the initial modulus of the core component polyester type polymer. In greater detail, the above composite ratio, namely the ratio of cross-sectional areas of core component to sheath component is suitably selectively set within a range of 90:10 to 10:90, preferably 80:20 to 20:80 or, more preferably, 70:30 to 30:70. If the composite ratio of the sheath component is extremely small, the core component polyester type polymer tends to come out of the fiber surface, and such as the heat resistance and the chemical stability of the fiber relative to rubber then tend to lower. On the other hand, if the ratio of sheath component polyamide type polymer is extremely large, then the initial modulus of the cord made of the core-sheath type composite fiber tends to be undesirably low.

For the method of the production of the core-sheath type composite fiber for use for or in the present invention, preferably such a high-speed spinning method is utilized, in which a core component and a sheath component are made a composite through a spinning nozzle, and the resulting composite is drawn at a spinning velocity of at least 2000 m/minute or, more preferably, at least 3000 m/minute. By such high-speed spinning, it is possible to effect a high composite adhesion to each other of the core component comprising a polyester type polymer and the sheath component comprising a polyamide type polymer. The reason for this has not been fully known yet, but it is inferable as follows: The crystallization of the two polymers or, more particularly, that of the polyamide type polymer which more easily undergoes crystallization than the polyester type polymer, is maintained in a suppressed condition through the high-speed spinning, and in that condition, the polymer chains of the polyamide type polymer are re-oriented in the fiber axial direction and the polyamide type polymer becomes united with the core component polyester type polymer the chains of which are at the same time re-oriented as above. Because of this, in the spinning step and the drawing step, the concentration of stress in the interface between the two polymers can be considerably suppressed.

As means for producing a fiber cord for the belt covering reinforcing layer using the core-sheath type composite fiber as prepared above, it may be operated to bundle and twist together to a cord form a plurality of core-sheath type composite fiber filaments. The coefficient of twist K to be imparted to the fiber cord in the above twisting step is represented by the following formula and it preferably is within a range of 1,000 to 3,000 or, more preferably, within a range of 1,400 to 2,400:

$$K = T\sqrt{D}$$

wherein T is the twist number (turns/10 cm) and D is the total denier of the cord.

Where the above twist coefficient K does not reach 1,000, the bundling property and the bonding property of the fiber cord tend to be insufficient, and if it exceeds 3,000 on the other hand, then the initial modulus of the fiber cord tends to be insufficient.

Also, preferably the fiber cord has an elongation not exceeding 6.5% after it is twisted and then subjected to a treatment with an adhesive under a load of 2.25 g/d and has a dry heat shrinkage not exceeding 6.0%. If the elongation of the fiber cord after it is treated with an adhesive exceeds 6.5%, then the initial modulus tends to lower, and if the dry heat shrinkage exceeds 6.0%, a slipping displacement is likely in the splice portion in the belt covering reinforcing layer accompanying to a shrinkage of the fiber cord which will take place at the time of vulcanization of green tires.

The belt covering reinforcing layer comprising cords of a core-sheath type composite fiber as above is incorporated in a tire so that the fiber cords are arranged substantially in the tire circumferential direction. In greater detail, the fiber cords are arranged at an angle of about 0° to 15° relative to the tire circumferential direction. If this cord angle is excessively large, then the tensile stiffness in the tire circumferential direction tends to be so lowered that the effect of preventing the belt layer from coming up or rising becomes reduced.

According to the present invention, even although the number of the belt covering reinforcing layer to be incorporated in the tire may vary depending on the end number of fiber cords to be arranged in the reinforcing layer (the cord density), it is sufficient if at least one belt covering reinforcing layer is incorporated in the tire. In the embodiment illustrated in FIG. 1, a single belt covering reinforcing layer is applied, covering a whole width portion of the belt layer, while in the embodiment shown in FIG. 2, two belt covering reinforcing layers are applied, one at respective side end portions of the belt layer. It is also possible to provide a belt covering reinforcing layer by spirally winding fiber cords arranged in a tape form having a width on the order of 5 to 20 mm, which may be wound in any desired shape about the belt layer.

Further, the above end number of fiber cords to be arranged in the belt covering reinforcing layer may vary depending on the kind of tires to be produced, but it may normally be 20 to 80 cords/5 cm or, more preferably, 30 to 70 cords/5 cm.

To carcass cords and belt cords for the radial tire according to the present invention, no particular limitation is applicable. For example, for carcass cords for passenger car radial tires, normally use is made of organic fibers such as nylon and polyester fibers, and for the belt cords, mainly steel cords are used.

According to the invention, the angular arrangement of cords for or in the carcass layer is not limited only to the direction perpendicular to the tire circumferential direction. As in carcass layers in generally called semi-radial tires, it may be designed to provide at least two carcass layers adjacent one another and arrange the carcass cords at an inclination within about 20° relative to the perpendicular direction to the tire circumferential direction.

As described above, in the radial tire according to the present invention, fiber cords made of a core-sheath type composite fiber filament comprising a core component of a polyester type polymer and a sheath component of a polyamide type polymer are used in the belt covering reinforcing layer, whereby it is possible to impart to the belt covering reinforcing layer a same high initial modulus as the one had with belt covering reinforcing layers comprising polyester fiber cords and, at the same time, to impart a same bonding property relative to rubber as the one had with belt covering reinforcing layers comprising polyamide fiber cords. In addition, the belt covering reinforcing layer according to the invention has such a remarkable heat resistance and a high dimensional stability that splice portions in the belt covering reinforcing layer can be prevented from undergoing a displacement, so that the radial tire according to the present invention can possess a high speed durability and a tire uniformity both of which are remarkable.

The above described fiber cords are possessed of remarkable bonding property and chemical stability which are comparable to those of polyamide fiber cords, so that only by a single step treatment with an adhesive, for example RFL, it is possible to impart a desirable bonding property toward rubber. On account of this, the step for the treatment with an adhesive can be simplified, the tire bundling efficiency can be improved, and the cost of the radial tire production can be curtailed.

Now, the invention will be described in further detail in connection with an example of radial tires embodying the invention. Further, the high speed durability and the uniformity of tires appearing in the below description were determined as follows.

High Speed Durability

Using an indoor drum tester, high speed durability tests of tires were carried out under the below conditions to determine the running velocity at which the tires became ruptured, and based on the determined results, a rating of tires are made.

The results of determinations are shown by indices taking as 100 the value found of a Conventional Tire A to be later described. Greater index values mean better high speed durability characteristics.

Test Conditions

Inflation Pressure P: 3.0 kgf/cm$^2$
Load W: JATMA Design Normal Load: 445 kg/Tire
Velocity: 170 km/hr, increased by 10 km/hr every 10 minutes
Drum Diameter: 1707 mm
Rim Size: 14×5½ JJ

Uniformity

Pursuant to JASO-C-607, "Test Method for Automobile Tire Uniformity", values of RFV (Radial Force Variation) were determined.

The results of the determinations are shown by indices taking as 100 the value found of the Conventional Tire A to be later described. Smaller index values mean better uniformity characteristics.

There were built as noted below, the described tires which include the Tire of the Invention, Conventional Tire A and Conventional Tire B, and evaluations of the three different Tires were conducted to obtain results with respect to the above described high speed durability and uniformity, as shown in the below table.

Further, the Tires were commonly of a tire size of 195/60R14.

Tire of the Invention

Two core-sheath type composite fiber filaments each comprising a core component of polyethylene terephthalate and a sheath component of nylon 66 and having a composite ratio in terms of the cross-sectional area ratio of core component to sheath component=50/50 and a denier (D) of 1500 D were drawn together and twisted to prepare a 1500 D/2 cord having a first twist of 40 turns/10 cm, a second twist of 40 turns/10 cm and a twist coefficient of K=2191. After this fiber cord was treated with an adhesive of a resorcinol-formalin-rubber latex (RFL), it was subjected to a heat treatment at 235° C. under a tension of 0.3 g/d to prepare an adhesive treated fiber cord having an elongation of 5.5% at a load of 2.25 g/d and a dry heat shrinkage at 150° C. of 3.2%.

In the cord density of 50 cords/5 cm, the above prepared adhesive treated fiber cord was embedded in an unvulcanized rubber to prepare a belt covering reinforcing layer, and a green tire having the tire structure shown in FIG. 1 was built, which was then subjected to a vulcanization molding treatment to obtain a tire according to the present invention.

Conventional Tire A

Two polyester fiber filaments having a denier of 1500 D were drawn together and twisted to obtain a 1500 D/2 cord having a first twist of 40 turns/10 cm, a second twist of 40 turns/10 cm and a twist coefficient of K=2191. This fiber cord was subjected to a pre-treatment using a polyester based adhesive, Vulcabond E, a product of Vulnax, and then to a treatment with the above described RFL adhesive, and was then heat treated at 235° C. under a tension of 0.3 g/d to prepare an adhesive treated fiber cord having an elongation of 5.3% at a load of 2.25 g/d and a dry heat shrinkage at 150° C. of 3.0%.

In the cord density of 50 cords/5 cm, the above prepared adhesive treated fiber cord was embedded in an unvulcanized rubber to prepare a belt covering reinforcing layer, and a green tire having the tire structure shown in FIG. 1 was built, which was then treated for vulcanization and molding to prepare a Conventional Tire A.

Conventional Tire B

Two nylon 66 fiber filaments having a denier of 1260 D were drawn together and twisted to obtain a 1260 D/2 cord having a first twist of 40 turns/10 cm, a second twist of 40 turns/10 cm and a twist coefficient of K=2008. After this fiber cord was treated with the above described RFL adhesive, it was subjected to a heat treatment at 225° C. under a tension of 1.5 g/d to prepare an adhesive treated fiber cord having an elongation of 7.0% at a load of 2.25 g/d and dry heat shrinkage at 150° C. of 4.2%.

In the cord density of 50 cords/5 cm, the above prepared adhesive treated fiber cord was embedded in an unvulcanized rubber to prepare a belt covering reinforcing layer, and a green tire having the tire structure shown in FIG. 1 was built, which was then treated for vulcanization and molding to prepare a Conventional Tire B.

|  | Tire of Invention | Conventional Tire A | Conventional Tire B |
|---|---|---|---|
| High Speed Durability | 118 | 85 | 100 |
| Uniformity | 93 | 94 | 100 |

From the above table, it is seen that with respect to the high speed durability, the Tire of the Invention exceeds each of the Conventional Tire A and the Conventional Tire B and that with respect to the uniformity, although it does not much exceed the Conventional Tire A, the Tire of the Invention greatly exceeds the Conventional Tire B.

What is claimed is:

1. A pneumatic radial tire comprising at least two belt layers reinforced with steel cords and disposed between a carcass layer and a tread, at least an end portion at each side of said belt layers being covered with at least one belt covering reinforcing layer comprising fiber cords arranged substantially in the circumferential direction of the tire, said fiber cords comprising a plurality of filaments of a core-sheath composite fiber comprising a core component of a polyester polymer comprising at least a member selected from the group consisting of polyethylene terephthalate and copolymers thereof and having an intrinsic viscosity of at least 0.80 when measured at 25° C. using orthochlorophenol as solvent, and a sheath component of a polyamide polymer comprising at least a member selected from the group consisting of polyhexamethylene adipamide, polytetramethylene adipamide, polycaprolactam and copolymers thereof and having a relative viscosity of at least 2.8 at 25° C. in sulfuric acid, and said fiber cords, when twisted and subjected to a treatment with an adhesive, have an elongation not exceeding 6.5% at a load of 2.25 g/d.

* * * * *